Patented Dec. 22, 1942

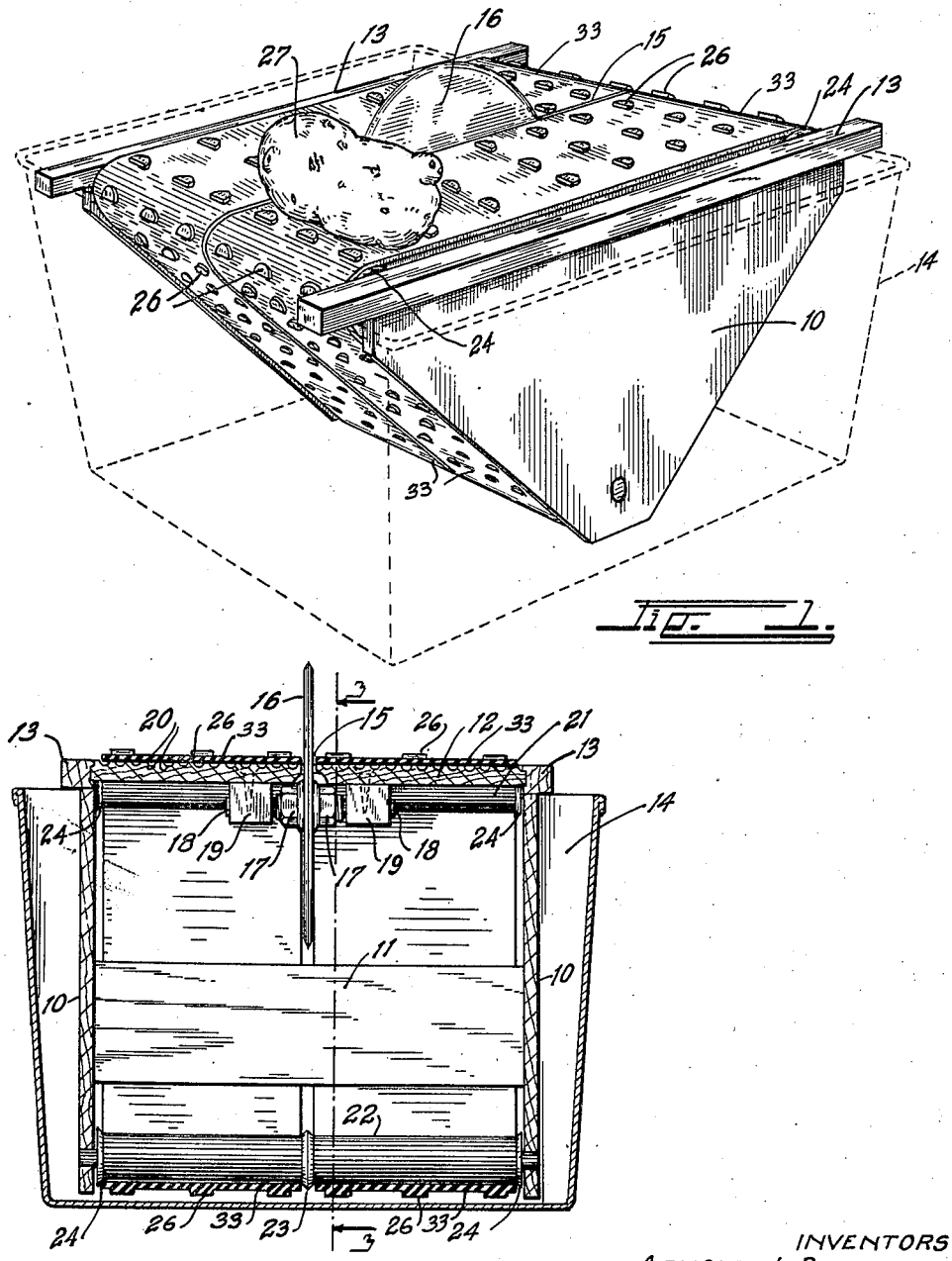

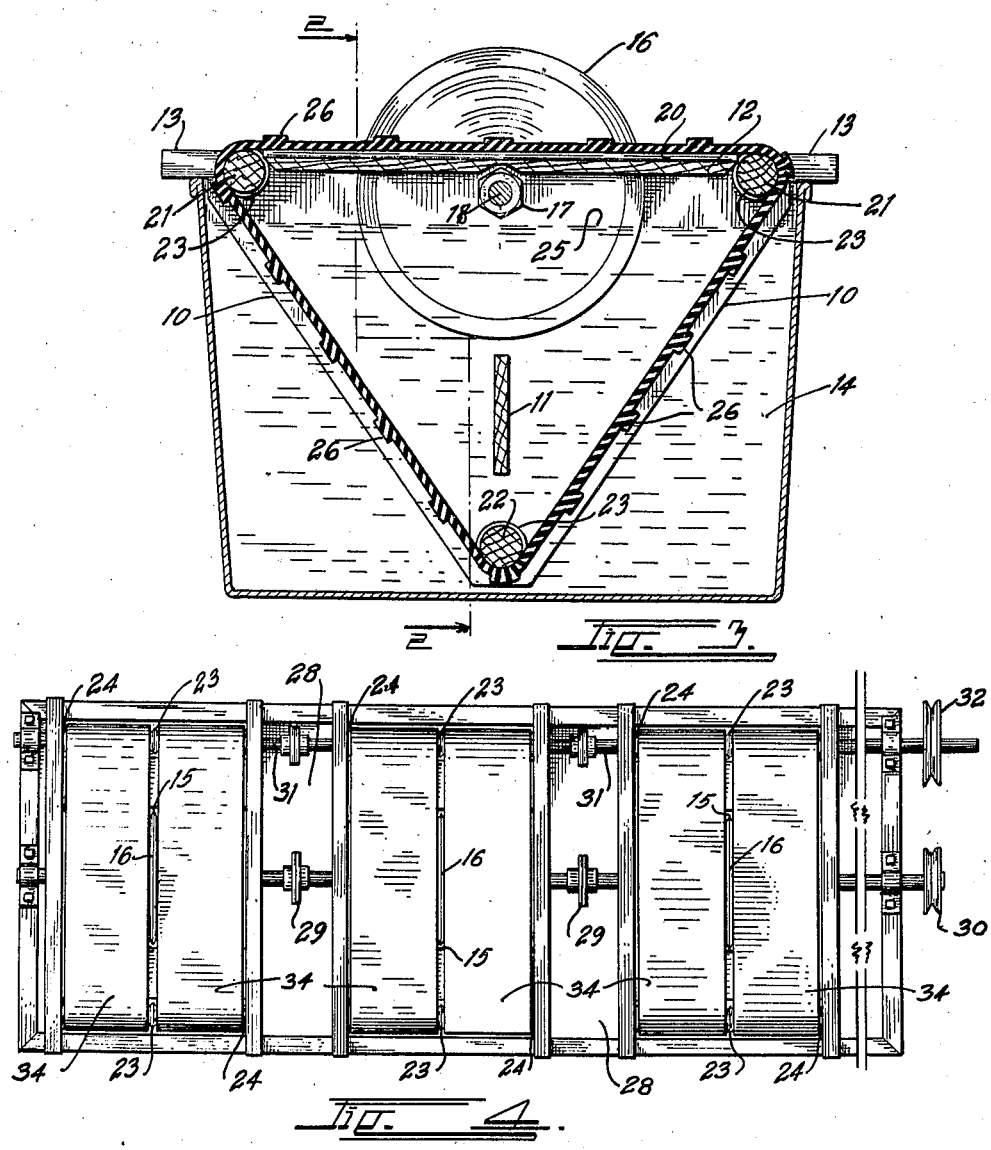

2,306,116

UNITED STATES PATENT OFFICE 2,306,116

SEED POTATO CUTTER

Arnold J. Dalton, Norman Jay Miller, and William S. Johnson, Eaton, Colo.

Application December 21, 1940, Serial No. 371,138

2 Claims. (Cl. 146—95)

This invention relates to a seed potato cutter. It has been found that one of the principal causes of the spread of diseases in potatoes and potato plants is caused from contamination of the seed potato knife and the supporting surface for the potato in a seed potato cutter. It can be readily seen that the knife used for slicing a diseased potato and all surfaces contacting the cut potato may be infected or contaminated and that this contamination will be spread to the cut surfaces of other potatoes following the diseased potato through the cutter, thus, resulting in a rapid spread of the infection.

The principal object of the invention is to provide a speed potato cutter in which the knife and all surfaces which contact a potato in any way will be sterilized before they contact the succeeding potatoes so as to prevent the spread of infection.

Another object of the invention is to provide a simple and highly efficient sterile potato cutter which can be used either as a hand device or as a power operated machine and which will adapt itself to sectional assembly so that any desired number of cutters may be placed in operation depending upon the requirements.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:

Fig. 1 is a perspective view of the improved seed potato cutter;

Fig. 2 is a cross section through the cutter of Fig. 1, illustrating the cutter in place in a sterilizing solution tank;

Fig. 3 is a longitudinal section of the cutter in place in a solution tank; and

Fig. 4 is a plan view of an assembly of cutters mounted in a single elongated solution tank.

The improved cutter employs two triangular side boards 10 held in rigid, spaced relation by means of a cross brace 11 and a table top 12. The table top 12 is secured to two side pieces 13 which are secured to and extend beyond the edges of each side board 10. The projecting cross pieces 13 are for the purpose of supporting the entire device from the upper edge of a suitable vat or tank 14 containing a sterilizing solution.

The table top 12 is formed with a longitudinally extending knife slot 15 at its middle through which a circular cutting knife 16 projects upwardly. The knife 16 is preferably formed from a suitable non-corrosive metal plate with its edges beveled and ground to form a sharp cutting edge. The circular knife is clamped between two clamp nuts 17 on a knife shaft 18. The knife shaft is journalled in suitable journal blocks 19 secured to the bottom of the table top 12.

A plurality of longitudinally extending drain grooves 20 are formed in the table top at each side of the knife 16. A belt roller 21 is positioned at each end of the table top 12. These rollers are journalled in suitable openings in the side boards 10. A third roller 22 is journalled between the side boards 10 at their lower triangular apex.

Two endless, flexible belts 33 are trained around the three rollers, there being one belt at each side of the knife 16. The belts 33 are preferably, but not necessarily, of molded rubber. The rollers run freely so that a slight pressure along either belt will cause the belts to move and the rollers to roll. The two belts are held separated a sufficient distance to pass the knife 16 by means of a middle separating flange 23 and are prevented from working off the rollers by means of end flanges 24.

In use, the device is suspended in the tank 14 and the latter is partially filled with a sterlizing solution, substantially to the height indicated at 25, so that the lower portion of the knife and the lower reaches of the belts 33 are constantly submerged in the sterilizing solution. The belts are preferably provided with surface lugs 26 to increase their surface traction.

For hand operation, a potato, such as indicated at 27, is placed on the belts 33 and pushed against the knife. The belts travel forwardly with the moving potato and the knife also rotates forwardly, due to the friction of the potato against its upper portion, and the potato is severed into two halves. The cut halves are then placed on the belts 33 with their cut surfaces down and are again forced against the knife. This is repeated until all desired cuts have been made.

After each cut both the surfaces of the knife and the surfaces of the belts which contacted the cut potato have moved forwardly sufficiently so that they will not contact the next potato or portion to be cut. Before these surfaces again reach an operative position, they all will have traveled through the sterilizing solution in the tank so that at all times a fresh sterilized surface is presented to the potatoes.

The grooves 20 in the table top serve both to reduce friction between the table and the belt and also to drain solution from beneath the belts back into the solution vat 14.

For ordinary use, the device above described is all that is required. No driving power is necessary. For use in large installations where high speed is desirable, several of the devices may be assembled side by side in a single elongated solution tank 28, as indicated in Fig. 4. These devices may be hand operated or if additional speed is required, may be arranged to be connected to a source of power. This can be done by extending the knife shaft 18 beyond the sides of the cutters and connecting the shafts of the adjacent cutters together by means of suitable couplings 29. The entire series of connected shafts can then be driven through a single belt pulley 30. One of the rollers 21 of each cutter can also be mounted on an extension shaft 31 and these shafts connected together and to a single drive pulley 32 so that both the belts and the cutting knife will be power rotated.

For a power driven device, the lugs 26 are not necessary and the belts may have natural smooth surfaces, such as illustrated by the belts 34, in Fig. 4.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A self sterilizing seed potato cutter comprising: two triangular side boards; cross members holding said side boards in spaced, parallel relation with a horizontal side upward and their apexes downward; three rotatable rollers extending between said boards and positioned substantially at each corner thereof; a table top extending between the side boards and between the upper two rollers; a circular knife extending upward through the mid-portion of said table top; an endless belt around all rollers at each side of said knife; lugs projecting from the surface of said belts to engage a potato being forced against said knife to transmit the movement of said potato to said belts; a tank; a side piece extending along each side of said table top and outwardly beyond the upper two rollers at each end of said top and resting on the upper edge of said tank; and a sterilizing solution in said tank immersing the lower reaches of both belts and the lower portion of said knife.

2. A self sterilizing seed potato cutter comprising: two triangular side boards, cross members holding said side boards in spaced, parallel relation with a horizontal side upward and their apexes downward; three rotatable rollers extending between said boards and positioned substantially at each corner thereof; a tatble top extending between the side boards and between the upper two rollers; a circular knife extending upward through the mid-portion of said table top; an endless belt around all rollers at each side of said knife; a tank; a side piece extending along each side of said table top and projecting outward beyond the upper two rollers at each end of said top and resting on the upper edge of said tank; and a sterilizing solution in said tank immersing the lower reaches of both belts and the lower portion of said knife.

ARNOLD J. DALTON.
NORMAN JAY MILLER.
WILLIAM S. JOHNSON.